2 Sheets--Sheet 1.

R. S. REYNOLDS.

Grain-Drier.

No. 6,361. Reissued March 30, 1875.

*Witnesses:*

Jesse B. Wheeler

John W. Webster

*Inventor:*

Ransom S. Reynolds

2 Sheets--Sheet 2.

R. S. REYNOLDS.

Grain-Drier.

No. 6,361. Reissued March 30, 1875.

Witnesses:

Jesse B. Wheeler

John W. Welsh

Inventor:

Ransom S. Reynolds

UNITED STATES PATENT OFFICE.

RANSOM S. REYNOLDS, OF WATERBURY, CONNECTICUT, ASSIGNOR, BY MESNE ASSIGNMENTS, TO JAMES A. MALONEY, JAMES S. WELCH, ABRAHAM H. HERR, EDWARD P. WELCH, JAMES H. WELCH, ROSIA W. WELCH, AND HERBERT P. WELCH.

IMPROVEMENT IN GRAIN-DRIERS.

Specification forming part of Letters Patent No. 38,985, dated June 23, 1863; reissue No. 6,361, dated March 30, 1875; application filed March 22, 1875.

*To all whom it may concern:*

Be it known that I, RANSOM S. REYNOLDS, of Waterbury, county of New Haven, in the State of Connecticut, have invented certain new and useful Improvements in an Apparatus for Drying, Cooling, and Cleaning Grain, &c.; and that the following is a full, clear, and exact description thereof, reference being had to the accompanying drawings, making a part of this specification, in which—

Figure 1:
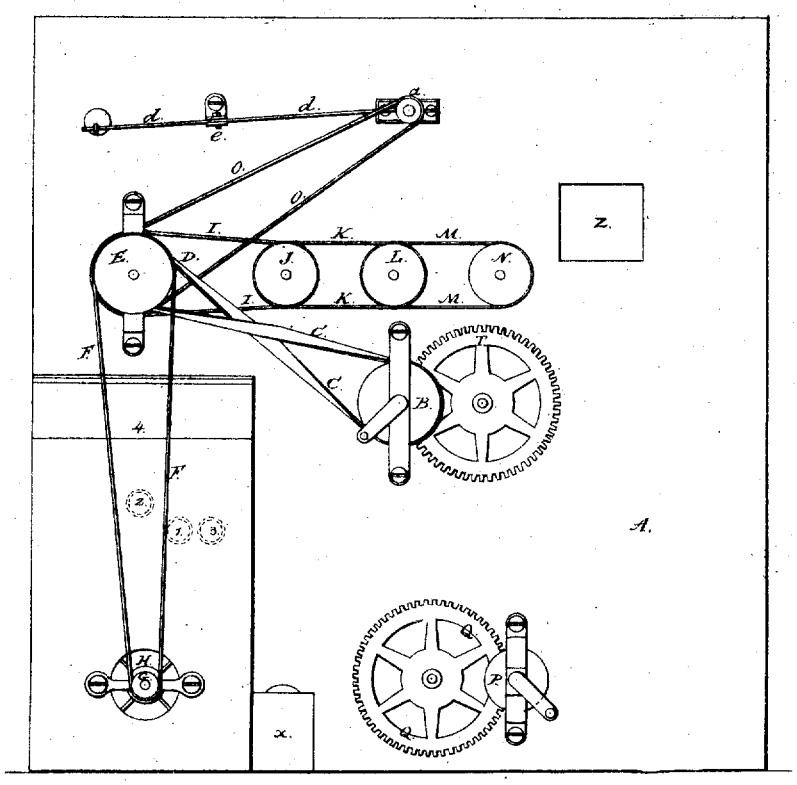
Figure 3:
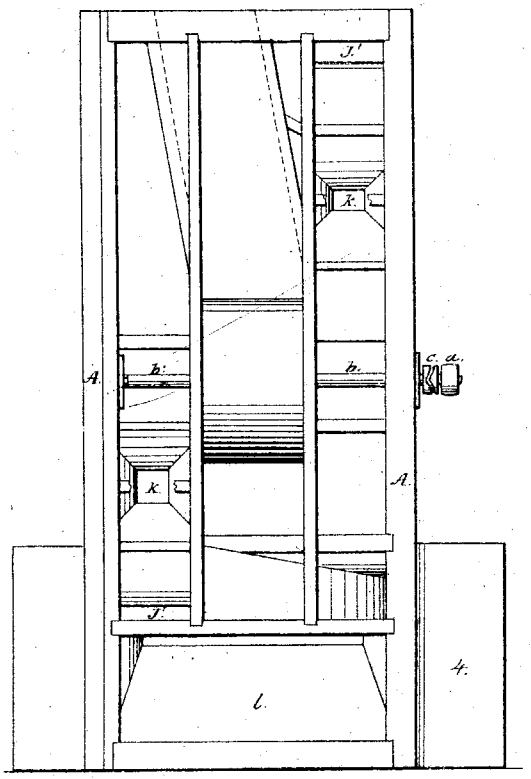
Figure 2:
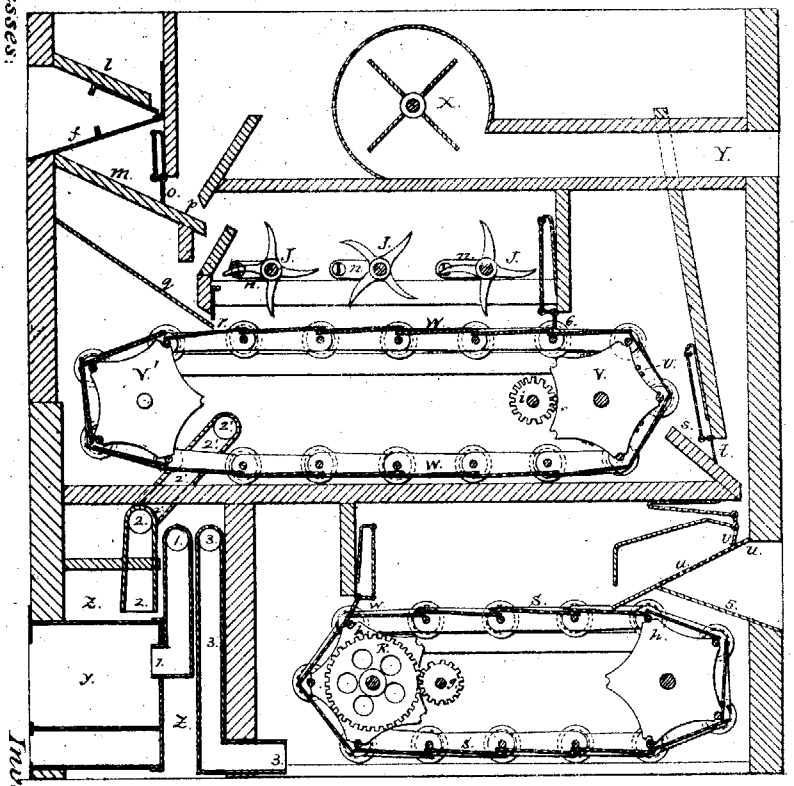

Figure 1 represents an elevation of one of the sides of the apparatus, showing the driving-gear. Fig. 2 represents a vertical longitudinal section through the same. Fig. 3 represents a top plan.

Similar letters of reference where they occur denote like parts of the apparatus in all the figures.

To enable others skilled in the art to make and use my invention, I will proceed to describe the same with reference to the drawings.

A represents a case for inclosing the apparatus, said case being furnished with such openings only as are necessary for the inlet and exit of the heated and cool or dry air as may be necessary for acting on the grain or other material, carrying off the dust or other impurities.

The moving parts of the apparatus may be driven as follows: A pulley, B, driven by a crank or from any first-moving power, has around it an endless belt, C, which is twisted and passed around another pulley, D, to give it motion. From a pulley, E, on the same shaft with the pulley D, passes an endless belt, F, which passes around a pulley, G, on the fan-shaft of the fan-blower H, that supplies the air that is to be used for drying and cleaning, as well as the cool air for cooling the grain or other material, as will be hereinafter explained. From a third pulley on the same shaft with the pulleys D E passes an endless belt, I, to and around a pulley on the same shaft with, but concealed by, the pulley J, and from J another belt, K, passes around L, and from a pulley behind L a belt, M, passes to and around a pulley, N. From a pulley on the same shaft with those D E a belt, O, passes to and around a small pulley, *a*, on the end of the upper fan-shaft *b*, as seen in Fig. 3, and on this fan-shaft there is a cam-wheel, *c*, that gives a vibrating motion to an arm, *d*, Fig. 1, pivoted at *e*, the further end of said arm being connected to a riddle or screen, *f*, for taking out any coarse impurities from the grain or other material before it enters the machine or apparatus to be dried, cooled, and cleaned. At the lower side of the case is a pulley, P, which may get its motion from the first motor or from the pulley B, as may be found most advantageous. On the shaft of the pulley P there is a pinion that works into the gear-wheel Q, and gives said gear-wheel its motion, and this gear-wheel, by means of interior pinions *g* on the same shaft with itself and interior gear-wheel R and chain-wheels *h* on other shafts, but driven by the pinions *g*, give motion to the endless perforated moving apron or screen S. The shaft carrying the pulley B has a pinion upon it that gears with and drives the cog-wheel T, on whose shaft there are also placed, inside of the case, pinions *i*, that gear with cog-wheels U behind, but on the same shaft with, the chain-wheels V, for carrying and moving the upper perforated moving apron or screen W, for which the chain-wheel V also acts as a supporter. The shafts of the pulleys J L N, which pass through the machine, are supported in hinged arms *n*, so that they can rise or fall without slacking their belts, and these shafts carry a series of stirrers, *j*, (there being several on each shaft,) for moving the grain or other material on the apron or screen W as it is carried through the machine.

The fan X on the shaft *b*, and driven by the belt O and pulley *a*, is a suction-fan, which draws from the inside of the apparatus, and from above the perforated apron or screen, all the light dust and impurities loosened from the grain or other material by the stirrers, or by its transit through the machine, and expels it through the trunk or trough Y out of the machine. The dust, &c., drawn to the suction-fan comes up through vertical passages *j'*, and thence to the eyes of the fan-case.

*k k* are recesses, in the bottoms of which are valves opening outward from the current of air drawn toward the fan. In these recesses much of the heavier impurities will fall and settle, there being an eddy or calm in them, and when filled access can be had to them through openings Z in the sides of the case to empty them of the accumulation therein.

The grain or other material to be dried, cooled, or cleaned is admitted into the hopper *l*, and thence passes over the shaken riddle or screen *f* onto a guiding-board, *m*, and from thence through an adjustable opening, *o*, and passage *p*, onto a guiding-board, *q*, and adjustable throat *r*, onto the endless moving apron or screen W, which carries it forward, while the stirrers J are constantly agitating it in its passage. The grain or other material, having reached the turn at the end of the traverse of the moving apron or screen W, falls upon a guiding-board, *s*, and passes thence through an adjustable opening, *t*, onto a screen, *u*, and thence through a self-acting throat, *v*, onto the second endless moving apron or screen S, at the end of which another self-acting throat, *w*, is arranged, where the grain or other material which has been cooled and cleaned on the apron S is delivered into a spout, and conducted out of the machine at *x*.

*y* is a furnace set in a chamber, *z*, so that its heat will only be carried into such parts of the apparatus as may be desirable by pipes or passages, the furnace being separated by suitable partitions from the chambers and passages of the machine. The pipe 1 is a smoke-flue for carrying off the gases, &c., the pipe 2 brings a volume of air from the fan-blower H, and delivers it against the furnace in the furnace-chamber *z*, where it is heated, if desired, and by the pressure in said chamber driven through pipes 2′ into the drying and cleaning chamber, so that it may envelop the moving apron or screen W, and pass through the perforations thereof, and thus dry and clean the grain or other material. In that chamber the suction-fan X, superinducing an upward tendency to the air, draws it as it becomes heavy by its absorption of whatever moisture it finds in the grain or other material, as well as the impurities it gathers, and carries it up and throws it out of the machine by means of an air duct or trunk.

The pipe 3 communicates at its upper end with the fan-chamber 4, and the air forced into this pipe at its upper end by the fan-blower H is forced down through said pipe, and discharged underneath the lower perforated apron S, and disseminates itself throughout the chamber in which this apron moves, for the purpose of cooling the grain or other material.

The material to be dried or cleaned, in passing over the screen *u*, is freed from any impurities not previously taken out of it, and these impurities may pass off at 5 and out of the machine.

The inlets at *o v* and the exits at 6 *t w* are self-adjusting, while the others are adjustable by hand. The self-adjusting passages prevent the air from escaping, while the passage of the grain or other material is not incommoded thereby.

I have shown two aprons or screens, the upper one delivering the material to be dried or cleaned upon the next one below it, and the two belts moving in opposite directions; but the number of belts may be increased, each delivering in turn upon the next one below it, and they may be run in the same direction, if preferred.

It is not necessary that the pipe 3 should pass through the furnace-chamber, and is simply placed there for convenience for representing the invention, for, as its duty is to carry cool air from the fan chamber or blower to the apron or screen S, it may be arranged elsewhere and outside of the furnace-chamber.

Having thus fully described my invention, what I claim therein as new, and desire to secure by Letters Patent, is—

1. The combination, in a machine for drying, cooling, or cleaning grain or other material, of a horizontal movable apron or screen within an air-tight case, a blower-fan for producing an air-blast, auxiliary air-pipes connected with said fan to convey the air generated by the blower-fan immediately beneath said horizontal movable apron or screen, thereby causing the air to pass up through the perforations of the same, and a suction or exhaust fan and discharge duct or trunk connected with the chamber above the horizontal movable apron or screen, substantially as and for the purpose set forth.

2. In a machine for drying, cooling, or cleaning grain or other material, the combination of a horizontal movable apron or screen within an air-tight case, an air-blast from a fan-blower beneath it and auxiliary air-pipes, an exhaust or suction fan connected with the upper portion of said horizontal movable apron or screen, automatic valves for feeding and delivering the grain or other material, and preventing the entrance and exit of air with the grain or other material, substantially as and for the purpose set forth.

3. In a machine for drying, cooling, or cleaning grain or other material, the combination of a horizontal movable apron or screen within an air-tight case, with adjustable feed-regulator, an exhaust or suction fan, two or more eddy or calm chambers arranged above said horizontal movable apron or screen, substantially as and for the purpose set forth.

RANSOM S. REYNOLDS.

Witnesses:
JESSE B. WHEELER,
JOHN W. WEBSTER.